United States Patent
Nazari

(10) Patent No.: US 6,405,201 B1
(45) Date of Patent: Jun. 11, 2002

(54) METHOD AND APPARATUS FOR REDUCING NETWORK TRAFFIC FOR REMOTE FILE APPEND OPERATIONS

(75) Inventor: Siamak Nazari, Arcadia, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/454,247

(22) Filed: Dec. 2, 1999

(51) Int. Cl.[7] .............................................. G06F 17/30
(52) U.S. Cl. ........................................... 707/8; 707/10
(58) Field of Search .......................... 707/1, 8, 10, 100, 707/522, 200; 709/200, 201, 203, 101, 218, 219, 221, 227, 229, 245

(56) References Cited

U.S. PATENT DOCUMENTS

| | | | | |
|---|---|---|---|---|
| 4,887,204 A | * | 12/1989 | Johnson et al. | 364/200 |
| 5,717,919 A | * | 2/1998 | Kodavalla et al. | 395/608 |

* cited by examiner

*Primary Examiner*—Diane D. Mizrahi
*Assistant Examiner*—Apu Mofiz
(74) *Attorney, Agent, or Firm*—Park, Vaughan & Fleming LLP

(57) ABSTRACT

One embodiment of this mechanism provides a system that reduces network traffic and other system overhead for remote file append operations. This system generally operates by keeping track of file append operations on a local computer system when possible instead of always communicating with a remote file server. More specifically, the system operates by receiving a request at the local computer system to append additional data to a file residing in non-volatile storage on the remote file server. If sufficient space has been allocated to accommodate the additional data on the remote file server, the system writes the additional data to the end of a locally cached copy of the file in the local computer system. Next, the system updates a file length value stored in the local computer system to reflect the additional data. If sufficient space has not been allocated to accommodate the additional data on the remote file server, the system requests additional space to be allocated past the end of the file on the remote file server. If the request is granted, the system updates an allocated space value for the file stored on the local computer system to reflect the additional space. In one embodiment of the present invention, after the allocated space value for the file has been updated, the system writes the additional data to the end of a locally cached copy of the file in the local computer system. The system also updates the file length value stored on the local computer system to reflect the additional data.

37 Claims, 4 Drawing Sheets

METHOD AND APPARATUS FOR REDUCING NETWORK TRAFFIC FOR REMOTE FILE APPEND OPERATIONS

BACKGROUND

1. Field of the Invention

The present invention relates to file systems that are accessible across computer networks. More particularly, the present invention relates to a method and an apparatus for reducing network traffic for append operations to files that are located on a remote file server. This method and apparatus operates by keeping track of file append operations on a local computer system when possible instead of always communicating with the remote file server.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access a file on a server computer system across a network. Such distributed file systems make it easy to manipulate files located on a remote server. However, if such distributed file systems are not designed carefully, they can easily generate unnecessary communications across the network, which can degrade overall system performance.

Unnecessary network data transfers are often generated when an application appends data to a file located on a remote file server. For example, many applications continually append data to a log file. If the application is located on a client and the log file is located on a remote file server, each time data is appended to the log file, a packet is sent across the network to transfer data to the remote file server and another packet is returned to confirm that the data was received. These packets consume valuable network bandwidth and cause corresponding interrupts on the client in order to process the packets. These interrupts are time-consuming for an application on the client, because the application must typically save state in order to service each interrupt.

Note that most of this overhead is wasted because append operations commonly involve only a small amount of data. For example, if each append operation involves about 100 bytes of data, and each packet can transfer about 1000 bytes of data, the application generates ten packets to transfer an amount of data that could have been transferred in a single packet. Also suppose that each append operation generates a disk access on the file server to commit the data to non-volatile storage. If the disk block size is 8 K bytes, then the application generates 80 disk accesses to write an amount of data to disk that could have been written to the disk in a single access.

What is needed is a method and apparatus for accessing a file located on a remote server that does not generate unnecessary overhead in appending small amounts of data to a file.

SUMMARY

One embodiment of the present invention provides a system that reduces network traffic and other system overhead for remote file append operations. This system operates by keeping track of file append operations on a local computer system when possible instead of always communicating with a remote file server. More specifically, the system operates by receiving a request at the local computer system to append additional data to a file residing in non-volatile storage on the remote file server. If sufficient space has been allocated to accommodate the additional data on the remote file server, the system writes the additional data to the end of a locally cached copy of the file in the local computer system. Next, the system updates a file length value stored in the local computer system to reflect the additional data. If sufficient space has not been allocated to accommodate the additional data on the remote file server, the system requests additional space to be allocated past the end of the file on the remote file server. If the request is granted, the system updates an allocated space value for the file stored on the local computer system to reflect the additional space.

In one embodiment of the present invention, after writing the additional data to the end of a locally cached copy of the file in the local computer system, the system also updates the file length value stored on the local computer system to reflect the additional data.

In one embodiment of the present invention, the system propagates the additional data from the locally cached copy of the file to the non-volatile storage on the remote file server in a lazy manner. In a variation on the above embodiment, this propagation takes place during one of, an automatic periodic file system flush operation, a file synchronization operation, or a cache invalidation operation.

In one embodiment of the present invention, if the local computer system does not posses a write token allowing the local computer system to write to the file, the system requests the write token from the remote file server.

In one embodiment of the present invention, the additional space for the file is allocated in block-sized units that match a block size for the non-volatile storage, or that match a payload size for a network packet.

One embodiment of the present invention provides a system that reduces network traffic and other system overhead for remote file append operations. The system operates by receiving a request at the remote file server from a local computer system for additional space to be allocated past the end of a file residing in non-volatile storage on the remote file server. If sufficient space is available in the non-volatile storage, the system allocates and initializes the additional space. Next, the system informs the local computer system how much additional space was allocated so that the local computer system can update an allocated space value for the file stored on the local computer system. The system allows the local computer system to append data into the additional space without making requests to the remote file server. The system eventually receives data written into the addition space from the local computer system in a lazy manner. If sufficient space is not available in the non-volatile storage, the system informs the local computer system that the additional space cannot be allocated.

In one embodiment of the present invention, the system receives a request at the remote file server for a token for the file from a second client. This token allows a holder of the token to read from the file if the token is a read token and to write to the file if the token is a write token. If the local computer system holds the write token for the file, the system sends a request from the remote file server to the local computer system to invalidate the write token. This allows the local computer system to invalidate the write token. Next, the remote file server receives a file length value from the local computer system, and writes the file length value to the non-volatile storage. Finally, the system sends the requested token to the second client.

In a variation on the above embodiment, the local computer system invalidates the write token by downgrading the write token to a read token if the request from the second client is for a read token, and by invalidating the write token if the request from the second client is for the write token.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computer System

Figure 1:
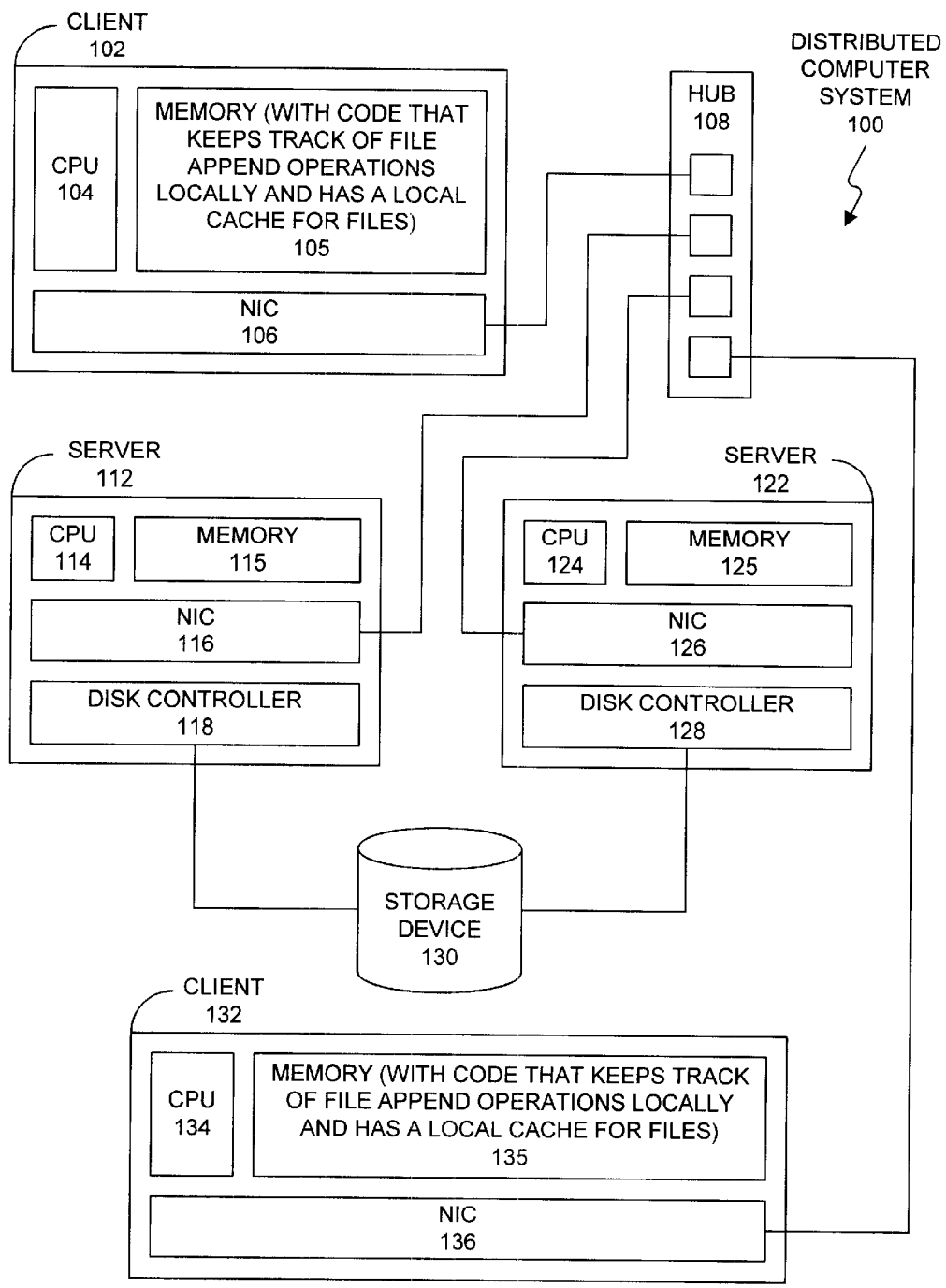
FIG. 1 illustrates a distributed computer system in accordance with an embodiment of the present invention.

FIG. 1 illustrates a distributed computer system 100 in accordance with an embodiment of the present invention. Distributed computer system 100 includes clients, 102 and 132, and servers, 112 and 122. Clients 102 and 132 can include any node on a network including computational capability and including a mechanism for communicating across the network. Servers 112 and 122 can include any node on a network including computational capability and data storage capability, as well as a mechanism for servicing requests from a client for computational and data storage resources.

Hub 108 implements a network that couples together clients 102 and 132 with servers 112 and 122. Clients 102 and 132, and servers, 112 and 122, use hub 108 to communicate with each other. Hub 108 is a special case of a general network that can be used with the present invention. This general network can include any type of wire or wireless link between computers including, but not limited to, a local area network, a wide area network, or a combination of networks.

Note that clients 102 and 132 are coupled to hub 108 through network interface controllers (NICs) 106 and 136. Similarly, servers 112 and 122 are coupled to hub 108 through NICs 116 and 126, respectively. NICs 106, 116, 126 and 136 can include any type of interface for coupling clients, 102 and 132, and servers, 112 and 122, with hub 108.

FIG. 1 also includes storage device 130, which is coupled to servers 112 and 122. Storage device 130 includes non-volatile storage for code and/or data and operates under control of servers 112 and 122. In one embodiment of the present invention, storage device 130 includes a disk drive.

Storage device 130 is coupled to disk controller 118 within server 112 and disk controller 128 within server 122. Disk controllers 118 and 128 include circuitry and software to control a number of disk spindles.

Clients 102 and 132 include central processing units (CPUs) 104 and 134. Similarly, servers 112 and 122 include CPUs 114 and 124. Central processing units 104, 114, 124 and 134 can include any type of processing engines that can be used in a computer system, including, but not limited to, microprocessors, mainframe processors, device controllers and processing circuitry within appliances.

CPUs 104 and 134 are coupled to memories 105 and 135, which include code to implement a client portion of a file system that keeps track of append operations locally in accordance with an embodiment of the present invention. CPUs 114 and 124 are coupled to memories 115 and 125, which include code to implement a server portion of a file system in accordance with an embodiment of the present invention. Memories 105, 115, 125 and 135 can include any type of random access memory containing code and/or data for CPUs 104, 114, 124 and 134, respectively.

In the embodiment of the present invention illustrated in FIG. 1, servers 112 and 122 are fault-tolerant. For example, assume server 112 is the primary server and server 122 is the secondary server, if primary server 112 fails during a file system operation, secondary server 122 takes its place. Note, however, that the present invention can be applied to any type of distributed file system, and is not limited to fault-tolerant file systems.

In one embodiment of the present invention, the system illustrated in FIG. 1 operates under control of the SOLARIST™ MC operating system, which is a product of Sun Microsystems, Inc. of Palo Alto, Calif. The Solaris MC operating system is a UNIX-based operating system. Hence, in describing the present technology, UNIX terminology and concepts are frequently used. However, this usage is for purposes of illustration and is not to be construed as limiting the invention to this particular operating system.

Sun, the Sun logo, Sun Microsystems and Solaris are trademarks or registered trademarks of Sun Microsystems, Inc. in the United States and other countries.

Layered Architecture for Distributed File System

Figure 2:
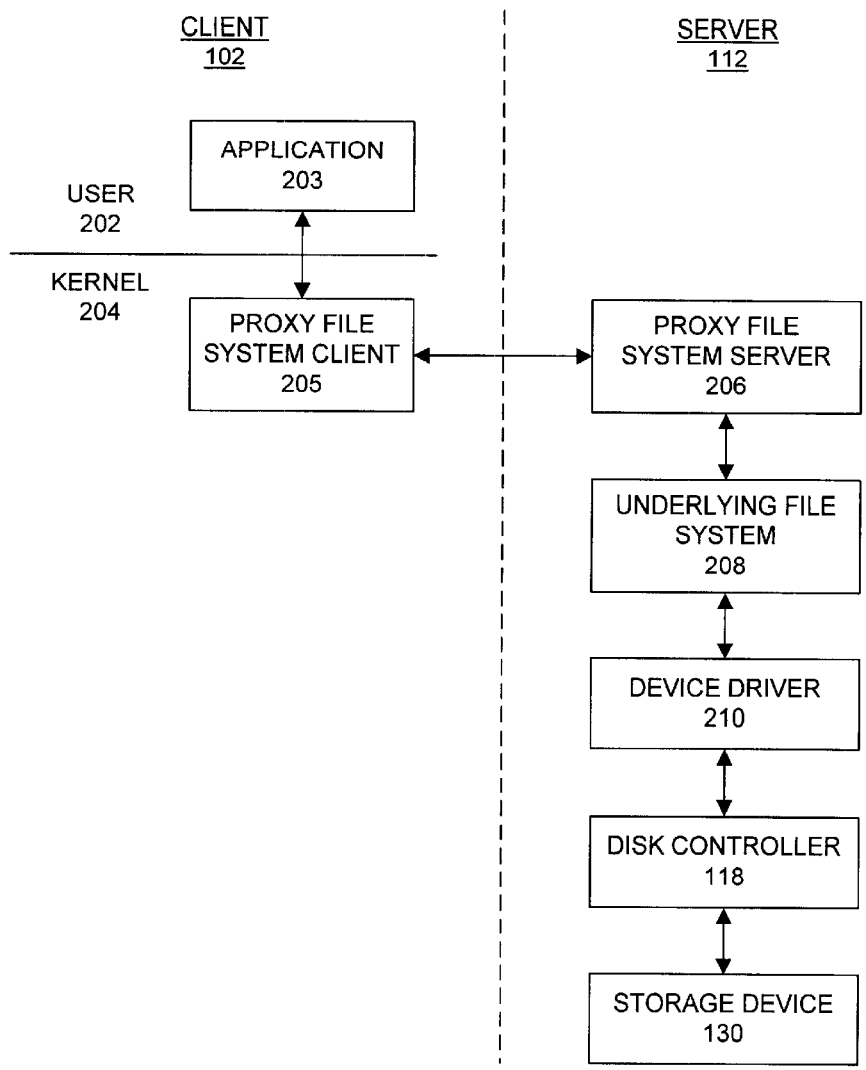
FIG. 2 illustrates a layered architecture for a distributed file system in accordance with an embodiment of the present invention.

FIG. 2 illustrates a layered architecture for a distributed file system in accordance with an embodiment of the present invention. The left-hand side of FIG. 2 illustrates layers that are present on a client side of the distributed file system. The right-hand side of FIG. 2 illustrates layers that are present on a server side of the distributed file system.

The client side of the distributed file system includes an application 203, which makes file system references. Application 203 operates in user space 202 and makes file system calls to proxy file system client 205 within kernel space 204. Proxy file system client 205 is the client-side portion of a distributed file system. Proxy file system client 205 communicates with proxy file system server 206 within server 122. Note that this communication takes place across a network through hub 108.

Proxy file system server 206 is the server-side portion of the distributed file system. Proxy file system server 206 communicates with underlying file system 208 on server 112.

Underlying file system 208 communicates with device driver 210, which contains code for communicating with disk controller 118 within server 112. Finally, disk controller 118 controls the operation of storage device 130. In one embodiment of the present invention, storage device 130 includes a disk drive.

File Structure

Figure 3:
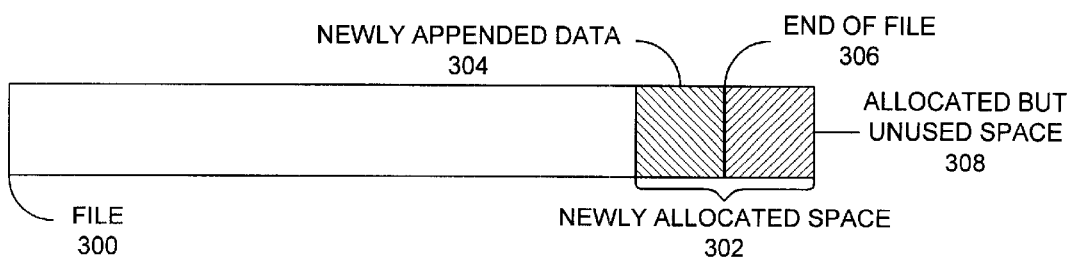
FIG. 3 illustrates a file to be appended in accordance with an embodiment of the present invention.

FIG. 3 illustrates the structure of a file to be appended in accordance with an embodiment of the present invention. File 300 resides on storage device 130 in FIG. 1 and includes newly allocated space 302, which may extend beyond the end of file 300. Space is typically allocated to file 300 in disk block-sized units during append operations. However, the newly appended data 304 may not take up all of the newly allocated space 302. Hence, there often remains a certain amount of allocated but unused space 308. When newly allocated space 302 is completely filled with additional appended data, a new block of space will be allocated for append operations to file 300.

Process of Performing Append Operation from the Client Side

Figure 4:
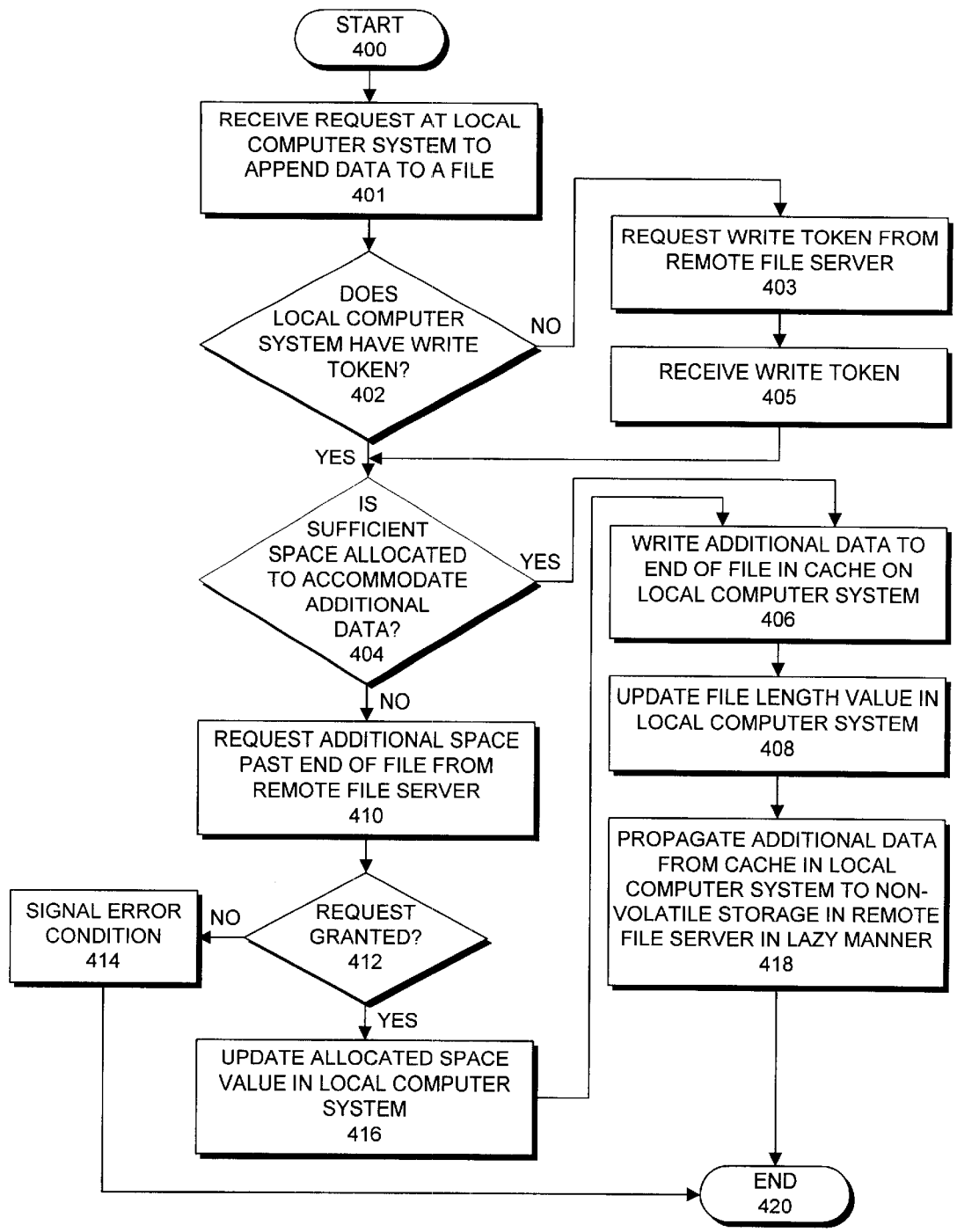
FIG. 4 is a flow chart illustrating the process of performing an append operation from the client side in accordance with an embodiment of the present invention.

FIG. 4 is a flow chart illustrating the process of performing an append operation from the client side in accordance with an embodiment of the present invention. The system starts by receiving a request to append additional data to file 300 at client 102 (step 401). This request results from application 203 performing a system call to perform a file append operation. Note that a file append operation can include an explicit file append operation or can include a seek to the end of file 300 and then a write to the end of file 300.

The system first determines if client 102 has a write token for file 300 (step 402). A write token allows client 102 to modify file 300, whereas a read token allows client 102 to read file 300. The use of tokens prevents multiple clients from simultaneously writing to and reading from file 300, which can produce unpredictable results.

If client 102 does not have a write token, client 102 requests the write token from server 112 (step 403). When the write token becomes available, client 102 receives the write token from server 112 (step 405).

Next, the system determines if there is sufficient space allocated for file 300 within storage device 130 to accommodate the additional data to file 300 (step 404). If so, client 102 proceeds to step 406. If not, client 102 requests additional space past the end of file 300 from server 112 (step 410). Client 102 then waits to see if the request for additional space is granted (step 412). If not, client 102 signals an error condition to application 203 (step 414). If so, client 102 updates an allocated space value stored locally on client 102 to account for the addition space (step 416).

Next, client 102 proceeds to write additional data to the end of a locally cached copy of file 300 in client 102 (step 406). Note that this write operation does not immediately result in data being transferred to file 300 within storage device 130. The system additionally updates a file length value stored locally in client 102 to indicate the new file length (step 408). The system eventually propagates the append data from the local cache to storage device 130 within server 112 in a lazy manner (step 418). This propagation can take place during an automatic periodic file system flush operation, during a file synchronization operation, or during a cache invalidation operation.

Process of Performing Append Operation from the Server Side

Figure 5:
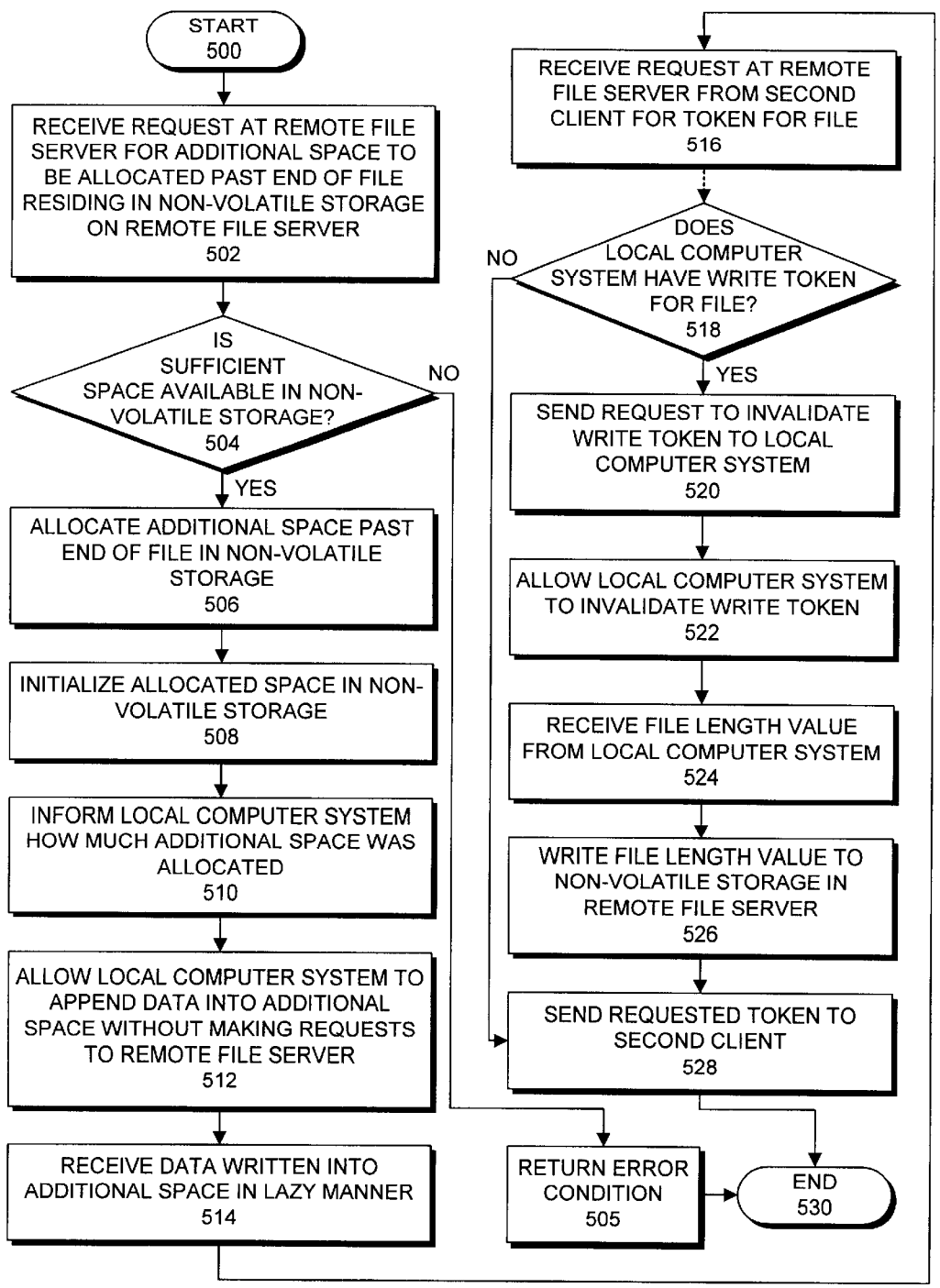
FIG. 5 is a flow chart illustrating the process of performing an append operation from the server side in accordance with an embodiment of the present invention.

FIG. 5 is a flow chart illustrating the process of performing an append operation from the server side in accordance with an embodiment of the present invention. The system starts by receiving a request at server 112 for additional space to be allocated past the end of file 300 residing in storage device 130 (step 502). This request was generated in step 410 of the flow chart illustrated in FIG. 4. The system first determines if sufficient space is available on storage device 130 to allocate the additional space (step 504). If not, server 112 returns an error condition to client 102 (step 505). If so, server 112 allocates additional space past the end of file 300 in storage device 130 (step 506). Server 112 then initializes the additional space in order to erase any old data that may reside in the newly allocated space (step 508). Server 112 also tells client 102 how much additional space was allocated so that client 102 can update its allocated space value (step 510).

Next, server 112 allows client 102 to append data into the additional space in its locally cached copy of file 300 without communicating with server 112 (step 512). Server 112 receives the appended data when the appended data eventually propagates back to server 112 in lazy manner (step 514).

Server 112 also manages tokens that control access to file 300. (Token management is not part of the process of steps 502–516.) For example, suppose server 112 receives a request for a token for file 300 from client 132 (step 516). The system determines whether another client holds a token for file 300 (step 518). If so, server 112 has to invalidate the token on the other client. Suppose client 102 holds a write token for file 300. In this case, server 112 sends a request to client 102 to invalidate the write token (step 520). Next, server 112 allows client 102 to invalidate the write token (step 522). If client 132 requested a read token, this invalidation process involves downgrading the write token on client 102 to a read token. On the other hand, if client 132 requested a write token, this invalidation process involves invalidating the write token on client 102.

After the write token is invalidated, server 112 receives the file length value from client 102 as well as all of the data that has been appended to the locally cached copy of file 300 on client 102 (step 524). Server 112 writes the file length value to non-volatile storage in storage device 130 (step 526), and then sends the requested token to client 132. At this point client 132 can access file 300.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for reducing network traffic for remote file append operations by keeping track of file append operations on a local computer system when possible instead of always communicating with a remote file server, comprising:

maintaining an allocated space value at the local computer system indicating the amount of space available on the remote file server;

receiving a request at the local computer system to append additional data to a file residing in non-volatile storage on the remote file server;

determining if sufficient space has been allocated to accommodate the additional data on the remote file server by referencing the allocated space value on the local computer system without having to access the remote file server to determine the amount of space available on the remote file server; and if sufficient space has been allocated to accommodate the additional data past the end of the file on the remote file server, writing the additional data to the end of a locally cached copy of the file in the local computer, updating a file length value stored in the local computer system to reflect the additional data, and updating the allocated space value stored in the local computer system to reflect the additional data appended to the file.

2. The method of claim 1, further comprising, if sufficient space has not been allocated to accommodate the additional data past the end of the file on the remote file server, requesting additional space to be allocated past the end of the file on the remote file server, and if the request is granted, updating an allocated space value for the file stored on the local computer system to reflect the additional space.

3. The method of claim 2, further comprising, after the allocated space value for the file has been updated, writing the additional data to the end of the locally cached copy of the file in the local computer system; and updating the file length value stored on the local computer system to reflect the additional data.

4. The method of claim 3, further comprising propagating the additional data from the cache in the local computer system to the non-volatile storage on the remote file server in a lazy manner.

5. The method of claim 4, wherein propagating the additional data to the non-volatile storage takes place during one of, an automatic periodic file system flush operation, a file synchronization operation, and a cache invalidation operation.

6. The method of claim 1, further comprising if the local computer system does not posses a write token allowing the local computer system to write to the file, requesting the write token from the remote file server.

7. The method of claim 1, wherein the request to the append additional data to the file includes one of, a file append operation and a file write operation directed to the end of the file.

8. The method of claim 2, wherein the additional space for the file is allocated in block-sized units that match a block size for the non-volatile storage.

9. The method of claim 2, wherein the additional space for the file is allocated in block-sized units that match a payload size for a network packet.

10. A method for reducing network traffic for remote file append operations by keeping track of file append operations on a local computer system when possible instead of always communicating with a remote file server, comprising:

maintaining an allocated space value at the local computer system indicating the amount of space available on the remote file server;

receiving a request at the remote file server from the local computer system for additional space to be allocated past the end of a file residing in non-volatile storage on the remote file server;

determining if sufficient space has been allocated to accommodate the additional data on the remote file server by referencing the allocated space value on the local computer system without having to access the remote file server to determine the amount of space available on the remote file server; and if sufficient space is available in the non-volatile storage, allocating and initializing the additional space past the end of the file in the non-volatile storage, informing the local computer system how much additional space was allocated so that the local computer system can update an allocated space value for the file stored on the local computer system, updating the allocated space value stored in the local computer system to reflect the additional data appended to the file, and allowing the local computer system to append data into the additional space without making requests to the remote file server.

11. The method of claim 10, further comprising if sufficient space is not available in the non-volatile storage, informing the local computer system that the additional space cannot be allocated.

12. The method of claim 10, further comprising receiving data written into the addition space from the local computer system in a lazy manner.

13. The method of claim 10, wherein allocating the additional space includes allocating a block of additional space that matches a block size for the non-volatile storage.

14. The method of claim 10, wherein allocating the additional space includes allocating a block of additional space that matches a payload size for a network packet.

15. The method for claim 10, further comprising, receiving a request at the remote file server for a token for the file from a second client, the token allowing a holder of the token to read from the file if the token is a read token and to write to the file if the token is a write token;

if the local computer system holds the write token for the file, sending a request from the remote file server to the local computer system to invalidate the write token, allowing the local computer system to invalidate the write token, receiving a file length value from the local computer system, and writing the file length value to the non-volatile storage in the remote file server; and sending the requested token to the second client.

16. The method of claim 15, wherein allowing the local computer system to invalidate the write token comprises:

allowing the local computer system to downgrade the write token to a read token if the request received from the second client is for a read token; and allowing the local computer system to invalidate the write token if the request received from the second client is for the write token.

17. A computer readable storage medium storing instructions that when executed by a computer cause the computer to perform a method for reducing network traffic for remote file append operations by keeping track of file append operations on a local computer system when possible instead of always communicating with a remote file server, comprising:

maintaining an allocated space value at the local computer system indicating the amount of space available on the remote file server;

receiving a request at the local computer system to append additional data to a file residing in non-volatile storage on the remote file server;

determining if sufficient space has been allocated to accommodate the additional data on the remote file server by referencing the allocated space value on the local computer system without having to access the remote file server to determine the amount of space available on the remote file server; and if sufficient space has been allocated to accommodate the additional data past the end of the file on the remote file server, writing the additional data to the end of a locally cached copy of the file in the local computer system, updating a file length value stored in the local computer system to reflect the additional data, and updating the allocated space value stored in the local computer system to reflect the additional data appended to the file.

18. The computer-readable storage medium of claim 17, further comprising, if sufficient space has not been allocated to accommodate the additional data past the end of the file on the remote file server, requesting additional space to be allocated past the end of the file on the remote file server, and if the request is granted, updating an allocated space value for the file stored on the local computer system to reflect the additional space.

19. A computer readable storage medium storing instructions that when executed by a computer cause the computer to perform a method for reducing network traffic for remote file append operations by keeping track of file append operations on a local computer system when possible instead of always communicating with a remote file server, comprising:

maintaining an allocated space value at the local computer system indicating the amount of space available on the remote file server;

receiving a request at the remote file server from the local computer system for additional space to be allocated past the end of a file residing in non-volatile storage on the remote file server;

determining if sufficient space has been allocated to accommodate the additional data on the remote file server by referencing the allocated space value on the local computer system without having to access the remote file server to determine the amount of space available on the remote file server; and if sufficient space is available in the non-volatile storage, allocating and initializing the additional space past the end of the file in the non-volatile storage, informing the local computer system how much additional space was allocated so that the local computer system can update an allocated space value for the file stored on the local computer system, updating the allocated space value stored in the local computer system to reflect the additional data appended to the file, allowing the local computer system to append data into the additional space without making requests to the remote file server, and receiving data written into the addition space from the local computer system in a lazy manner; and if sufficient space is not available, informing the local computer system that the additional space cannot be allocated.

20. The computer-readable storage medium of claim 19, further comprising if sufficient space is not available in the non-volatile storage, informing the local computer system that the additional space cannot be allocated.

21. The computer-readable storage medium of claim 19, further comprising receiving data written into the addition space from the local computer system in a lazy manner.

22. An apparatus that reduces network traffic for remote file append operations by keeping track of file append operations on a local computer system when possible instead of always communicating with a remote file server, comprising:

an allocated space value maintaining mechanism that maintains the allocated space value at the local computer system indicating the amount of space available on the remote file server;

a file request receiving mechanism at the local computer system that receives a request to append additional data to a file residing in non-volatile storage on the remote file server;

a file updating mechanism within the local computer system; and a determining mechanism that determines if sufficient space has been allocated to accommodate the additional data on the remote file server by referencing the allocated space value on the local computer system without having to access the remote file server to determine the amount of space available on the remote file server;

wherein if sufficient space has been allocated to accommodate the additional data past the end of the file on the remote file server, the file updating mechanism is configured to, update the allocated space value stored in the local computer system to reflect the additional data appended to the file, write the additional data to the end of a locally cached copy of the file in the local computer system, and update a file length value stored in the local computer system to reflect the additional data.

23. The apparatus of claim 22, wherein if sufficient space has not been allocated to accommodate the additional data past the end of the file on the remote file server, the file updating mechanism is configured to:

request additional space to be allocated past the end of the file on the remote file server; and to update an allocated space value for the file stored on the local computer system to reflect the additional space if the request is granted.

24. The apparatus of claim 23, wherein after the allocated space value for the file has been updated, the file updating mechanism is configured to, write the additional data to the end of the locally cached copy of the file in the local computer system; and to update the file length value stored on the local computer system to reflect the additional data.

25. The apparatus of claim 24, wherein the file updating mechanism is further configured to propagate the additional data from the cache in the local computer system to the non-volatile storage on the remote file server in a lazy manner.

26. The apparatus of claim 25, wherein the propagation of the additional data to the non-volatile storage takes place during one of, an automatic periodic file system flush operation, a file synchronization operation, and a cache invalidation operation.

27. The apparatus of claim 22, further comprising a token requesting mechanism that requests a write token from the remote file server if the local computer system does not posses the write token, the write token allowing the local computer system to write to the file.

28. The apparatus of claim 22, wherein the request to append the additional data to the file includes one of, a file append operation and a file write operation directed to the end of the file.

29. The apparatus of claim 22, wherein the additional space for the file is allocated in block-sized units that match a block size for the non-volatile storage.

30. The apparatus of claim 22, wherein the additional space for the file is allocated in block-sized units that match a payload size for a network packet.

31. A apparatus that reduces network traffic for remote file append operations by keeping track of file append operations on a local computer system when possible instead of always communicating with a remote file server, comprising:

an allocated space value maintaining mechanism that maintains the allocated space value at the local computer system indicating the amount of space available on the remote file server;

a request receiving mechanism within the remote file server that receives a request from the local computer system for additional space to be allocated past the end of a file residing in non-volatile storage on the remote file server;

a request processing mechanism within the remote file server; and a determining mechanism that determines if sufficient space has been allocated to accommodate the additional data on the remote file server by referencing the allocated space value on the local computer system without having to access the remote file server to determine the amount of space available on the remote file server;

wherein if sufficient space is available in the non-volatile storage, the request processing mechanism is configured to, update the allocated space value stored in the local computer system to reflect the additional data appended to the file, allocate and initialize the additional space past the end of the file in the non-volatile storage, inform the local computer system how much additional space was allocated so that the local computer system can update an allocated space value for the file, and allow the local computer system to append data into the additional space without making requests to the remote file server.

32. The apparatus of claim 31, wherein if sufficient space is not available in the non-volatile storage, the request processing mechanism is configured to inform the local computer system that the additional space cannot be allocated.

33. The apparatus of claim 31, wherein after allowing the local computer system to append data into the additional space, the request processing mechanism is configured to receive data written into the addition space from the local computer system in a lazy manner.

34. The apparatus of claim 31, wherein the additional space for the file is allocated in block-sized units that match a block size for the non-volatile storage.

35. The apparatus of claim 31, wherein the additional space for the file is allocated in block-sized units that match a payload size for a network packet.

36. The apparatus for claim 31, wherein the request receiving mechanism is configured to receive a request for a token for the file from a second client, the token allowing a holder of the token to read from the file if the token is a read token and to write to the file if the token is a write token; and further comprising a token processing mechanism;

wherein if the local computer system holds the write token for the file, the token processing mechanism is configured to, send a request from the remote file server to the local computer system to invalidate the write token, allow the local computer system to invalidate the write token, receive a file length value from the local computer system, and write the file length value to the non-volatile storage in the remote file server; and a sending mechanism that is configured to send the requested token to the second client.

37. The apparatus of claim 36, wherein the write token is invalidated on the local computer system by:

downgrading the write token to a read token if the request received from the second client is for a read token; and invalidating the write token if the request received from the second client is for the write token.

* * * * *